(12) United States Patent
Mohammadi et al.

(10) Patent No.: US 8,536,080 B2
(45) Date of Patent: Sep. 17, 2013

(54) BORON CARBIDE CERAMIC FIBERS

(75) Inventors: Farhad Mohammadi, Westampton, NJ (US); Richard B. Cass, Ringoes, NJ (US)

(73) Assignee: Advanced Cetametrics, Inc., Lambertville, NJ (US)

( * ) Notice: Subject to any disclaimer, the term of this patent is extended or adjusted under 35 U.S.C. 154(b) by 772 days.

(21) Appl. No.: 12/486,832

(22) Filed: Jun. 18, 2009

(65) Prior Publication Data

US 2009/0318280 A1    Dec. 24, 2009

Related U.S. Application Data

(60) Provisional application No. 61/073,468, filed on Jun. 18, 2008.

(51) Int. Cl.
| | |
|---|---|
| C04B 35/52 | (2006.01) |
| D01C 5/00 | (2006.01) |
| G21C 21/00 | (2006.01) |
| D01F 6/18 | (2006.01) |
| D01F 9/12 | (2006.01) |
| C01G 56/00 | (2006.01) |
| C01G 43/00 | (2006.01) |
| C01B 31/36 | (2006.01) |
| C01B 31/34 | (2006.01) |
| C01B 31/04 | (2006.01) |

(52) U.S. Cl.
USPC ............. 501/87; 264/29.2; 264/0.5; 264/182; 423/251; 423/256; 423/291; 423/345; 423/440; 423/447.5; 423/448

(58) Field of Classification Search
USPC ............. 264/29.2, 29.4, 29.6; 423/291, 439, 423/440; 501/87, 93
See application file for complete search history.

(56) References Cited

U.S. PATENT DOCUMENTS

| | | | |
|---|---|---|---|
| 1,501,419 | A | 7/1924 | Podszus |
| 3,269,802 | A | 8/1966 | Wainer et al. |

(Continued)

FOREIGN PATENT DOCUMENTS

WO    PCT/US09/47737    7/2009

*Primary Examiner* — Guinever Gregorio
(74) *Attorney, Agent, or Firm* — Watov & Kipnes, P.C.; Kenneth Watov

(57) ABSTRACT

A metal carbide ceramic fiber having improved mechanical properties and characteristics and improved processes and chemical routes for manufacturing metal carbide ceramic fiber. Metal carbide ceramic fibers may be formed via reaction bonding of a metal-based material (e.g. boron) with the inherent carbon of a carrier medium. One embodiment includes a method of making a metal carbide ceramic fiber using VSSP to produce high yield boron carbide fiber. Embodiments of the improved method allow high volume production of high density boron carbide fiber. The chemical routes may include a direct production of boron carbide fiber from boron carbide powder ($B_4C$) and precursor (e.g. rayon fiber) having a carbon component to form a $B_4C$/rayon fiber that may be processed at high temperature to form boron carbide fiber, and that may be subsequently undergo a hot isostatic pressing to improve fiber purity. Another route may include a carbothermal method comprising combining boron powder (B) with a precursor (e.g., rayon fiber) having a carbon component to form a B/rayon fiber, carbonizing and a chemical reaction of boron (B) and carbon (C) to form boron carbide fiber. Another carbothermal method may comprise combining boron oxide powder ($B_2O_3$) with a precursor (e.g., rayon fiber) having a carbon component to form a $B_2O_3$/rayon fiber, carbonizing and a chemical reaction of boron oxide ($B_2O_3$) and carbon (C) to form boron carbide ($B_4C$) fiber.

10 Claims, 12 Drawing Sheets

(56) References Cited

U.S. PATENT DOCUMENTS

| | | | |
|---|---|---|---|
| 3,403,008 A * | 9/1968 | Hamling | 423/251 |
| 3,429,722 A | 2/1969 | Economy et al. | |
| 3,433,725 A | 3/1969 | Hough et al. | |
| 3,619,223 A * | 11/1971 | Brower et al. | 106/166.52 |
| 3,632,710 A | 1/1972 | Jahn | |
| 3,725,533 A | 4/1973 | Economy et al. | |
| 3,825,469 A | 7/1974 | Economy et al. | |
| 3,971,840 A | 7/1976 | Economy et al. | |
| 4,126,652 A | 11/1978 | Oohara et al. | |
| 4,238,547 A | 12/1980 | Economy et al. | |
| 4,904,424 A | 2/1990 | Johnson | |
| 4,940,424 A * | 7/1990 | Odbert | 439/369 |
| 5,116,679 A | 5/1992 | Nadkarni et al. | |
| 5,429,778 A * | 7/1995 | Patel et al. | 264/29.2 |
| 5,560,991 A * | 10/1996 | Patel et al. | 428/367 |
| 5,614,415 A | 3/1997 | Markin | |
| 5,654,094 A * | 8/1997 | Patel et al. | 428/367 |
| 5,827,797 A | 10/1998 | Cass et al. | |
| 5,985,670 A | 11/1999 | Markin | |
| 6,368,712 B1 | 4/2002 | Kobayashi et al. | |
| 2004/0192534 A1 | 9/2004 | Nixon et al. | |
| 2007/0128434 A1 | 6/2007 | Motoda et al. | |

* cited by examiner

B₄C+C+Al

BORON CARBIDE CERAMIC FIBERS

CROSS REFERENCE TO RELATED APPLICATIONS

This application claims the benefit of U.S. Provisional Patent Application 61/073,468 filed Jun. 18, 2008, the disclosure of which is being incorporated herein by reference in its entirety.

TECHNOLOGY FIELD

The subject matter described herein relates generally to ceramic fibers, and in particular to metal carbide ceramic fibers, including boron carbide ceramic fiber, as well as improved methods of making these fibers.

BACKGROUND

Boron carbide ($B_4C$) is one of the hardest materials known, ranking third behind diamond and cubic boron nitride. It is the hardest material among mass-produced materials (i.e., materials produced in tonnage quantities).

Boron carbide may be used in a wide variety of applications, including ballistic and abrasive applications. For example, boron carbide is the Defense Department's material of choice for ballistic applications, such as body armor. Also, boron carbide materials may be used in military and commercial vehicles in war zones to protect against the pervasive threat of improvised explosive devices. Boron carbide materials may help improve survivability and mobility in future military combat vehicles and aircraft. Boron carbide materials, however, have an Achilles' heel in that conventional means of making boron carbide have several drawbacks.

Commercial production of boron carbide powder may be accomplished via several methods. Boron carbide powder may be produced by reacting carbon with boron oxide ($B_2O_3$) in an electric arc furnace at high temperatures, through Carbothermal reduction or by gas phase reactions. The process is strongly endothermic. The starting material may be an intimate mixture of boric oxide and petroleum coke. In addition to boron carbide powder, large amount of carbon monoxide are generated. For commercial use, boron carbide ($B_4C$) powder usually needs to be milled and purified to remove metallic impurities.

Another production process of boron carbide powder is the reduction of boron with the presence of magnesium. This process is highly endothermic and typically occurs at 1,000-1,200° C.

Conventional boron carbide parts may be fabricated by hot pressing, sintering and sinter—Hot Isostatic Pressing (HIPing). Industrially, densification may be carried out by hot pressing (e.g., 2,100-2,200° C., 30-40 MPa) boron carbide powder in an inert atmosphere, such as argon. This commercial process (i.e., hot pressing) squeezes boron carbide powder together between large dies, while heating to elevated temperatures, and yields materials with a relative density that could be as high as 98.1% theoretical density. Other materials that may be used include: Al, V, Cr, Fe, Co, Ni, Cu, Mg, BN, MgO, $Al_2O_3$, etc. Hot pressing is typically used to manufacture simple shapes. Improved properties may be obtained when pure fine powder is densified with sintering aid additives.

Typical firing processes include two step heating cycles: binder burnout (or burn-off) and sintering. The first heating cycle, binder burnout, typically occurs at relatively low temperature (500-600° C.) and functions to remove the binder. This typically includes burnout or removal of the cellulose, which acts as a binder. For example, hydrogen and oxygen are removed and carbon monoxide is produced. As such, there is no, or very little, free carbon remaining. The second heating step includes sintering at a very, very high heating cycle (around 2,200° C.). Sintering basically fuses all the particles together to make a single solid part.

Modified boron carbide formation processes also exist. For example, a pressureless sintering process. This pressureless sintering process (e.g., 2,000-2,200° C.) may improve the density and hence the ballistic performance of boron carbide. Pressureless sintering to high density is possible using ultra fine powder with additives (e.g., in-situ carbon, alumina). The pressureless sintering process yields a 92-97% theoretical density ($D_{th}$).

For more demanding applications, post-sintering hot isostatic pressing (HIPing) may be used to increase the relative density to 99% ($D_{th}$) through the hydrostatic squeezing action at a high temperature and pressure (e.g., 1,700° C., 200 MPa), in a controlled atmosphere (e.g., Ar, He gas).

The boron carbide powder used to form conventional boron carbide materials has a reputation for poor performance during sintering—a high-temperature process in which particles consolidate, without melting, to eliminate pores between them in the solid state. Poor sintering yields a more porous material that fractures more easily. Due to the difficulties in sintering to high densities, metal carbide ceramics, such as boron carbide ($B_4C$) ceramics, are very hard to manufacture.

These manufacturing difficulties multiply for the fabrication of fibers made of these materials. Exemplary difficulties that may be encounter in attempting to manufacture boron carbide fiber include: spinning and material compatibility with the fiber manufacturing process being employed; fiber carbonization and controlling chemical reactions; stoichiometric production of boron carbide and compositional control; sintering study to produce high density boron carbide fiber; scale up production; and the like.

Alternative laboratory routes also exist and include CVD, crystal growth, etc. These routes are typically high cost, low volume, and slow.

What is needed is a process that allows a fiber comprising carbon and metal-based materials to be formed. What are also needed are improved manufacturing processes to facilitate formation of an improved metal carbide fiber. For example, a metal carbide fiber having light weight, increased hardness, and improved ballistic and/or erosive performance—than currently available boron carbide products made from boron carbide powder. Further, what are needed are improved methods of making metal carbide fibers that are easier to form and yield higher production volumes at lower costs. Improved boron carbide fibers, fiber composites, and methods of manufacturing boron carbide fibers that solve more than one or all of the disadvantages existing in the prior art while providing other advantages over the prior art would represent an advancement in the art.

SUMMARY

In view of the above shortcomings and drawbacks, metal carbide ceramic fibers, composites, products incorporating said fibers and/or said composites, and methods for producing metal carbide ceramic fibers are provided. This technology is particularly well-suited for, but by no means limited to, ballistic and erosion resisting applications.

One embodiment of the present invention is directed to a green fiber comprising a cellulose matrix and a metal-based carbide material dispersed within the matrix. Another embodiment is directed to a green fiber comprising a rayon matrix and boron carbide material dispersed within the rayon matrix.

The green fiber may then be heat treated (e.g., pressureless sintering) to densify the metal carbide ceramic fiber. The cellulose in the fiber may be used as a source of carbon to produce metal carbide in fiber form (e.g., boron carbide fiber). The carbon in the fiber viscose may be used as a sintering aid and to react with boron.

One embodiment of the invention is directed to a direct method of forming boron carbide fiber from boron carbide ($B_4C$) powder. In another exemplary embodiment, the carbon produced during the carbonization of cellulose $(C_6H_{10}O_5)_n$ may be used as the sintering aid for boron carbide fiber, as shown below.

$$B_4C+C \rightarrow B_4C$$

Also alumina ($Al_2O_3$), or other sintering aids, may be added to the fiber, as shown in formula:

$$B_4C+C+Al_2O_3 \rightarrow B_4C$$

The final products of both of the above formulas will be high-density boron carbide fiber.

According to another exemplary chemical route for forming boron carbide fiber, the boron carbide fiber may be formed from boron. In this carbothermal route, a carbide fiber (e.g. boron carbide) may be produced from its starting metal element (e.g., boron). In one embodiment, boron (B) powder can be used to manufacture a B-loaded cellulose matrix, such as rayon fiber. The chemical reaction to form $B_4C$ may be described as:

$$4B+C \rightarrow B_4C$$

Upon heat treatment, the carbon from the carbonization of cellulose $(C_6H_{10}O_5)_n$ reacts with boron metal and $B_4C$ is formed.

According to another exemplary chemical route, a carbothermal method of forming boron carbide fiber from boron oxide ($B_2O_3$) powder is disclosed. Boron oxide powder can be used to fabricate $B_2O_3$ green fiber. This fiber will be a composite comprising $B_2O_3$ particles in a cellulose matrix. The composite may be carbonized (graphitized) and then boron carbide may be produced as a result of a boron oxide and carbon chemical reaction, as shown below.

$$2B_2O_3+7C \rightarrow B_4C+6CO$$

To reduce the reaction temperature, magnesium may be added to the fiber, as shown below, which reduces the reaction temperature.

$$2B_2O_3+6Mg+C \rightarrow B_4C+6MgO$$

Upon heat treatment, the carbon, produced during the carbonization of cellulose $(C_6H_{10}O_5)_n$, reacts with boron oxide and $B_4C$ is formed.

In yet another exemplary chemical route, a slurry may be made of boron oxide and water or other liquids such as alcohol, acetone, etc. A rayon fiber may be passed through the slurry, and the rayon fiber may absorb boron oxide and the liquid. Upon drying, the resultant fiber will have boron oxide particles dispersed uniformly in the rayon fiber. Upon heat treatment, the carbon, produced during the carbonization of cellulose $(C_6H_1O_5)_n$, reacts with boron oxide and $B_4C$ may be formed:

$$(Cellulose)-7C+2B_2O_3 \rightarrow B_4C+6CO$$

Once the boron carbide fiber is formed by the spinning process (i.e., green fiber), the spun fiber may be further treated to improve the properties (e.g. density and hence the hardness) of the fiber. For example, the boron carbide fiber may be sintered at high temperature. In a preferred embodiment, the boron carbide fiber may be processed by pressureless sintering to achieve about 92% to about 97% theoretical density. Optional, or in addition, the boron carbide fiber may further processed by, for example, hot isostatic pressing (Post-HIPing) to further improve the fiber properties (e.g., density to about 99% to about 100% theoretical density).

The improved boron carbide formation processes and chemical routes yield boron carbide fibers having higher relative densities—and thus better ballistic and erosion performance—than currently available boron carbide products. Even more preferably, full density boron carbide fibers may be produced.

According to another aspect of the invention, the boron carbide ceramic fibers are produced using Viscose Suspension Spinning Process (VSSP) of fiber formation.

According to another aspect of the invention, the carbon matrix may comprise a rayon fiber, or a carbon based fiber made using pitch or pan manufacturing techniques. In preferred embodiments, the rayon fiber is a high purity rayon fiber.

Additional features and advantages of the invention will be made apparent from the following detailed description of illustrative embodiments that proceeds with reference to the accompanying drawings.

BRIEF DESCRIPTION OF THE DRAWINGS

The invention is best understood from the following detailed description when read in connection with the accompanying drawings. Included in the drawings are the following Figures that show various exemplary embodiments and various features of the present invention.

DETAILED DESCRIPTION OF ILLUSTRATIVE EMBODIMENTS

The present invention is directed to metal carbide ceramic fibers and improved methods of manufacturing metal carbide ceramic fibers. Preferred embodiments of the present invention are directed to boron carbide fiber and methods of manufacturing the same.

A metal-based material (e.g., boron) may be dispersed in a cellulose based viscose. The viscose may then be spun to form a fiber comprising carbon (cellulose) with the metal-based material dispersed therein. Preferably, the carbon fiber comprises a high purity rayon fiber. In one step, a green fiber of metal-based material and carbon may be formed.

The fiber may then be heat treated (e.g., pressureless sintering) to produce dense metal carbide ceramic fiber. The cellulose in the fiber may be used as a source of carbon to produce metal carbide in fiber form (e.g., boron carbide fiber). During a high temperature chemical reaction, the carbon in the precursor may react with metal-based material dispersed therein to form a metal carbide. The improved process of producing metal carbide fiber uses carbon in the fiber viscose as a sintering aid and to react with boron. Use of carbon in the fiber cellulose as a sintering aid—rather than burning it off as is typically done—also improves the sintering process and helps to reduce the sintering temperature.

The improved boron carbide formation processes and chemical routes yield boron carbide fibers having higher relative densities—and thus better ballistic and erosion performance—than currently available boron carbide products. Even more preferably, full density boron carbide fibers may be produced. The improved processes and chemical routes also yield high production volume of boron carbide fiber as compared to conventional methods.

Embodiments of the present invention comprise various methods or routes. In one embodiment a direct method is used. A direct method uses boron carbide as a metal-based material. In another embodiment, a carbothermal method may be used wherein the metal-based material comprises boron. In yet another embodiment, a carbothermal method may be used wherein a metal oxide precursor may be used as the metal-based material. In an alternate embodiment, a carbothermal method may be used wherein a metal oxide absorbed carbon based fiber may be used.

The following description focuses on boron-based materials and the production of boron carbide fiber, but it is contemplated that any metal carbide fiber can be produced using the disclosed methods and routes.

Boron carbide ($B_4C$) is the lightest technical ceramic material (e.g., 2.5 g/cm$^3$) as well as one of the hardest materials. Fully dense boron carbide may be characterized as: light weight; high hardness (third hardest material in the world); erosion resistance; high modulus; neutron absorber.

Figure 1:
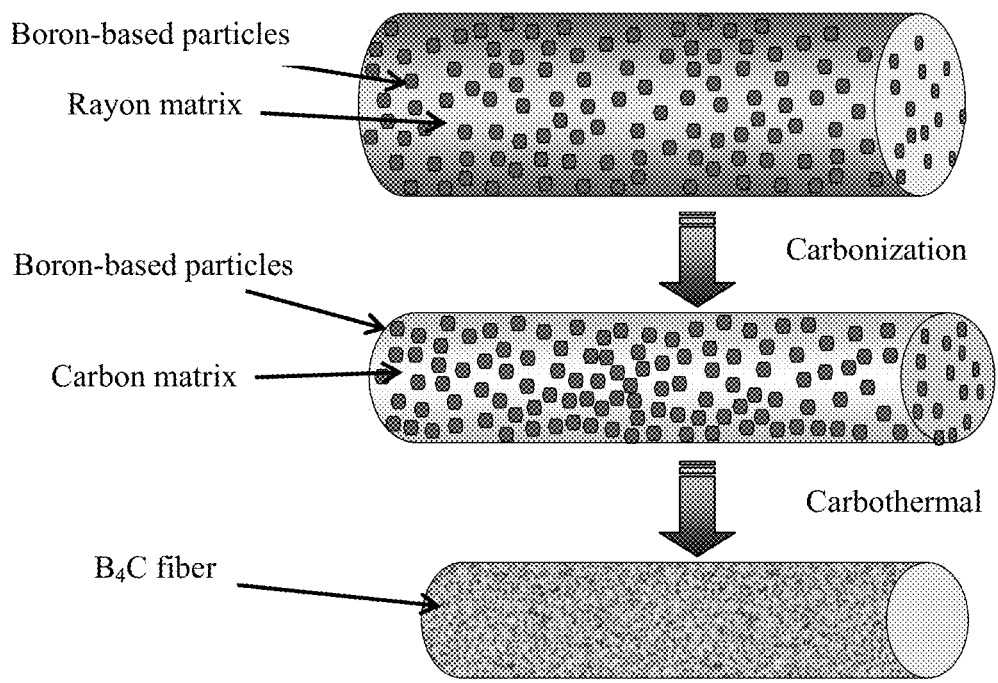
FIG. 1 shows a boron carbide fiber formed via viscose suspension spinning process.

Table 1 shows physical and mechanical properties of boron carbide as compared with other high strength ceramics for armor applications:

reduces its potential mechanical properties and chemical resistance. In all these routes, boron-based green fibers are made, which are essentially boron-based particles dispersed uniformly in a rayon matrix, as shown in FIG. 1. The precursors necessary for the chemical reactions are in the body of the fiber. As shown in FIG. 1, the composite is carbonized and then boron carbide ($B_4C$) is produced as a result of the boron-based material and carbon chemical reaction.

Figures 2A, 2B, 2C:
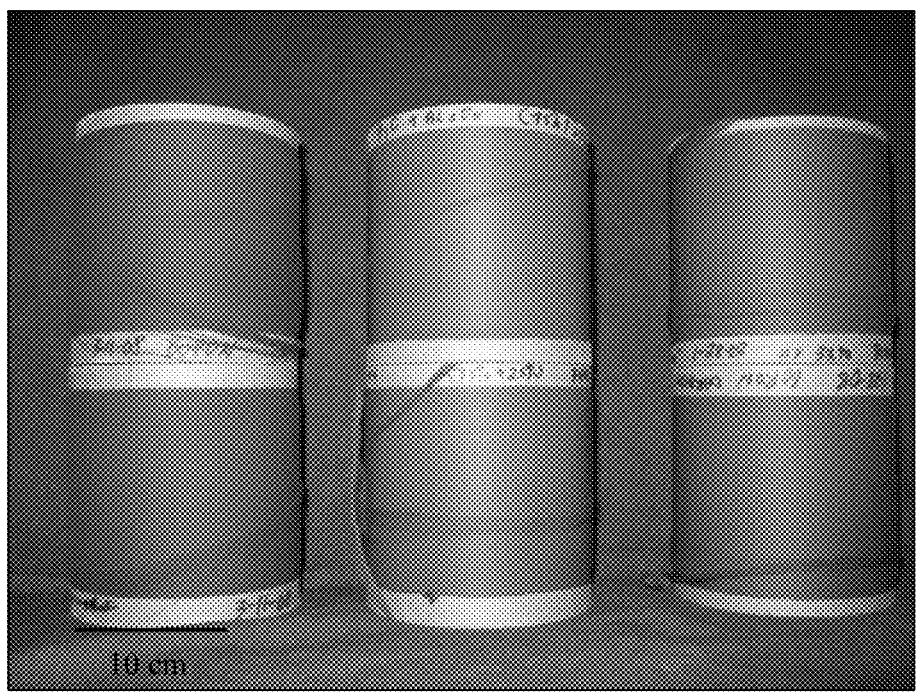
FIGS. 2A-2C show spools of green fiber.

FIGS. 2A-2C shows spools of green fiber. FIG. 2A is a spool of B+C green fiber; FIG. 2B is a spool of $B_4C$+5% wt $Al_2O_3$ green fiber; and FIG. 2C is a spool of pure $B_4C$.

Figure 3:
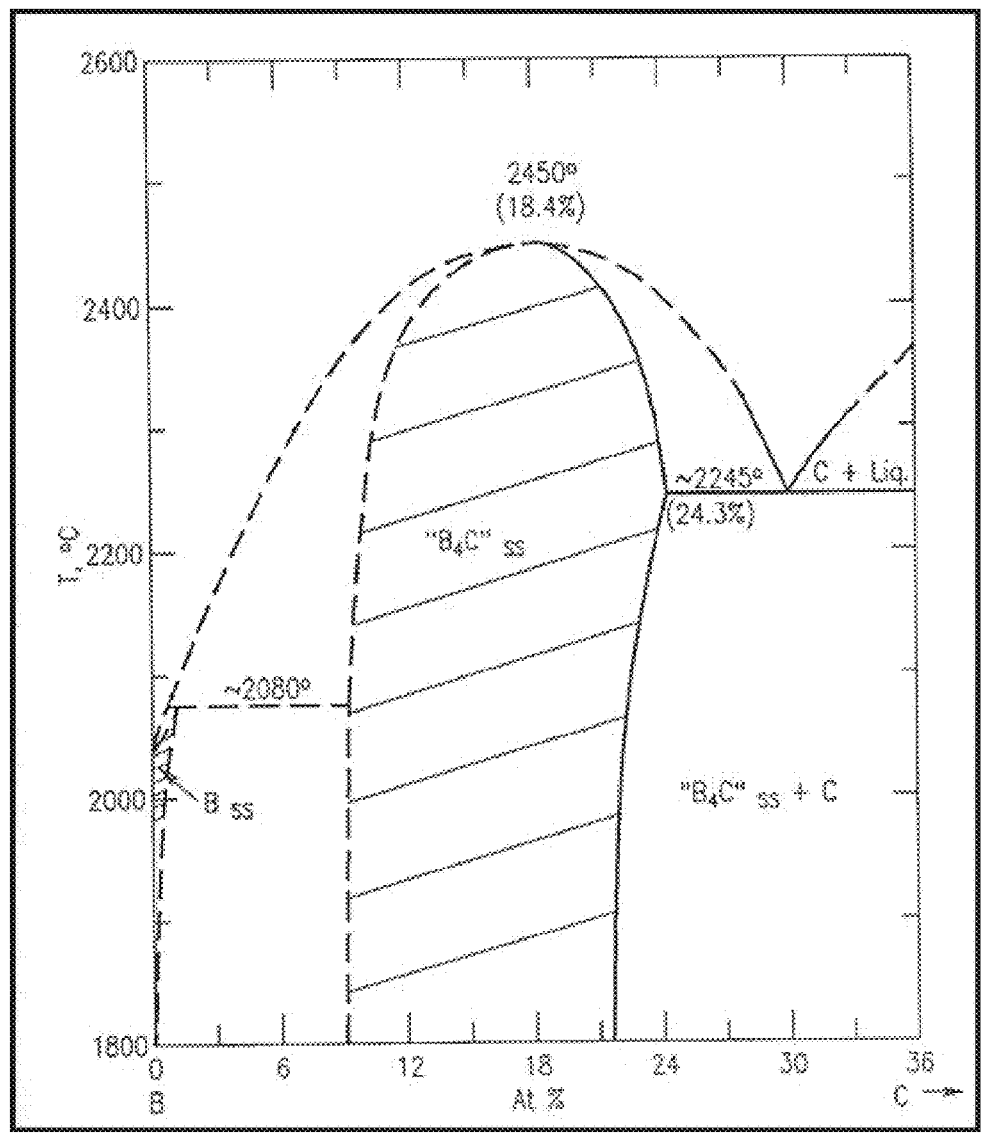
FIG. 3 shows an exemplary boron-carbon phase diagram.

FIG. 3 shows an exemplary boron-carbon phase diagram and illustrates the basic understanding of a B-C reaction.

Embodiments of the present invention use novel chemical routes to produce high density boron carbide fiber. Embodiments of the present invention also support high volume production of boron carbide fiber to meet, for example, the military's armor needs.

In one embodiment, viscose suspension spinning process (VSSP) may be used to form a fiber and novel chemical routes may be used to form metal carbide fibers. In the exemplary VSSP process shown in FIGS. 4 and 5, cellulose may be digested in a sodium hydroxide aqueous solution in the form of a viscous liquid (viscose) that is mixed with the starting ceramic/metal-based material (e.g., boron, boron oxide, boron carbide, other metal carbides, etc.) dispersed in water slurry. The ceramic/metal-based material may be added in the form of a powder, a solution, as part of a slurry, etc. This mix may then be pumped through numerous holes in a spinneret into a bath of warm, mild sulfuric acid with a high concentration of a salt. The acid/base reaction coagulates the cellulose into rayon fiber with a high volume percentage of the ceramic/metal-based material dispersed therein.

Embodiments of the present invention obtain carbon (C), necessary for these reactions to form carbides from cellulose $(C_6H_{10}O_5)_n$, as shown in FIG. 1. The amount of carbon obtained from cellulose may depend on its carbon-yield during the carbonization process, however, the cellulose amount can be tailored in, for example, the VSSP process. Embodiments of the present invention use the carbon in the viscose to reaction bond with the boron-based materials (or other metal carbides) to form stoichiometric boron carbide in fiber form.

During the VSSP process, ceramic particles of boron-based material may be added to the viscose prior to the spin-

| Compound | Density (g/cm$^3$) | Modulus of Rupture (MPa) | Modulus of Elasticity (GPa) | Fracture Toughness (MPam$^{1/2}$) | Knoop Hardness (GPa) | Coefficient of Thermal Expansion (10$^{-6}$/K) |
|---|---|---|---|---|---|---|
| $B_4C$ | 2.48 | 350 | 445 | 3.5 | 28.4 | 5.6 |
| $Al_2O_3$ | 3.97 | 276-700 | 380 | 2.7-4.2 | 18-23 | 7.2-8.6 |
| SiC | 3.18 | 610 | 430 | 5.2 | 24.5 | 4.5 |
| $Si_3N_4$ | 3.3 | 850 | 310 | 6.1 | 14.7 | 3.4 |

This material has high hardness and modulus of elasticity, and more importantly is lightweight. Boron carbide has a rhombohedral structure with 12 boron and 3 carbon atoms located on the corners and diagonal in its unit cell. The carbon atoms can be easily substituted, (e.g. boron, or even other atoms resulting in a range of compositions). Boron-rich compositions can vary from 78.26 wt. % boron ($B_4C$, no additional boron substitution) to 85.4 wt. % boron ($B_{6.5}C$). However, in the carbon-rich side, no composition with less than four borons per carbon has been observed. This means that there will be some graphite coexisting with boron carbide in the carbon-rich side. Commercial boron carbide is a composite of boron carbide and graphite as the second phase, which ning process. The boron-based material may be in the form of a powder, solution, etc. The boron-based material may be evenly and thoroughly mixed to evenly disperse it throughout the viscose. At this stage, the viscose is in the form of a slurry and may have a honey like appearance. The slurry may then pass through a spin bath and be spun to form a fiber comprising boron-based material+cellulose $(C_6H_{10}O_5)_n$ (see e.g. top fiber of FIG. 1). So in one step, two objectives are met. First, a fiber is being formed and second a carbon matrix having a boron-based material is also formed. At this point in the process, the particles are not attached to one another, but rather are separate particles in a matrix—e.g., rayon fiber having carbon, metal and ceramic based materials, binders, etc.—and the strength of the green rayon fiber comes from the strength of the matrix. This process of simultaneously forming a fiber comprising a carbon matrix having a boron-based material essentially performs two steps at once.

As shown in FIG. 1, boron (or any other metal) carbide fiber may be formed by reacting (e.g., reaction bonding) the carbon inherent in the carrier medium (i.e., the rayon fiber) as the reactive with the boron metal absorbed into the fiber during the fiber forming process. The process provides for the manufacture of carbon fiber with pure boron in it and reacting boron with the carbon in order to make boron carbide fiber.

The process may also include carbonization (see e.g. middle fiber of FIG. 1). Carbonization comprises heating in a controlled atmosphere, such as nitrogen or helium. The heating may be performed in a furnace, such as a carbon furnace. During the heating process, hydrogen and oxygen are removed leaving the carbon and boron-based material to form boron carbide in the form of a fiber.

The process of manufacturing boron carbide fiber may further comprise a carbothermal reaction (e.g., a high temperature chemical reaction) (see e.g. bottom fiber of FIG. 1). Optionally, post processing may include pressure sintering to further increase the density.

Boron carbide fibers may also be formed as composites. Composites typically have improved fracture toughness. Boron carbide fiber can be used to reinforce a metal matrix. For example, reinforcing of aluminum matrix with boron carbide fiber. The fiber can be short, long, two dimensional woven, or 3-dimensional woven.

The examples on this application are based on boron carbide fiber, however, this method of fiber manufacturing can be used to produce all metal carbide fibers. For example, the same method can be used to produce silicon carbide (SiC), tungsten Carbide ($W_2C$), tantalum carbide (TaC), titanium carbide (TiC), aluminum carbide ($Al_4C_3$), etc. In this application, boron carbide was used as an example.

Exemplary chemical routes of boron carbide fiber manufacturing are explained below:

Route No. 1: Boron Carbide ($B_4C$) Fiber from Boron (B)

Figure 6:
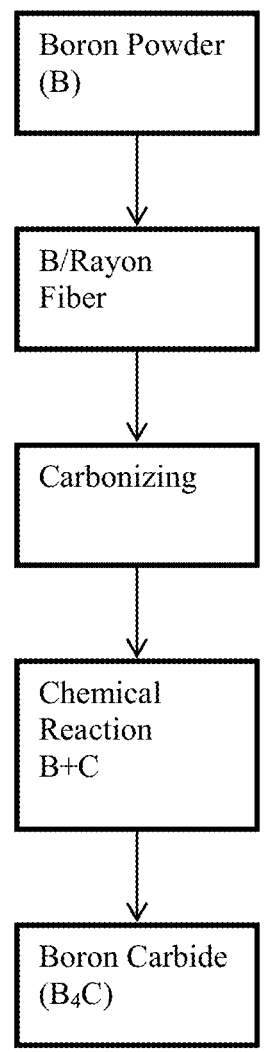
FIG. 6 is a block diagram showing an exemplary process for producing boron carbide fiber from boron.

FIG. 6 shows an exemplary chemical route for forming boron carbide fiber from boron. In this carbothermal route, a carbide fiber (e.g., boron carbide) is produced from its starting metal element (e.g., boron). In one embodiment, boron (B) powder can be used to manufacture a B-loaded cellulose matrix, such as rayon fiber. The chemical reaction to form $B_4C$ may be described as:

$$4B+C \rightarrow B_4C \tag{1}$$

Boron particles are preferably dispersed uniformly in a rayon matrix. Upon heat treatment, the carbon, produced during the carbonization of cellulose $(C_6H_{10}O_5)_n$, reacts with boron metal and $B_4C$ is formed. The heat treatment may be done in a controlled atmosphere ($N_2$, He, Ar, etc.) at temperatures up to about 2,300° C.

Route No. 2: Boron Carbide ($B_4C$) Fiber from $B_4C$ Powder

Figure 7:
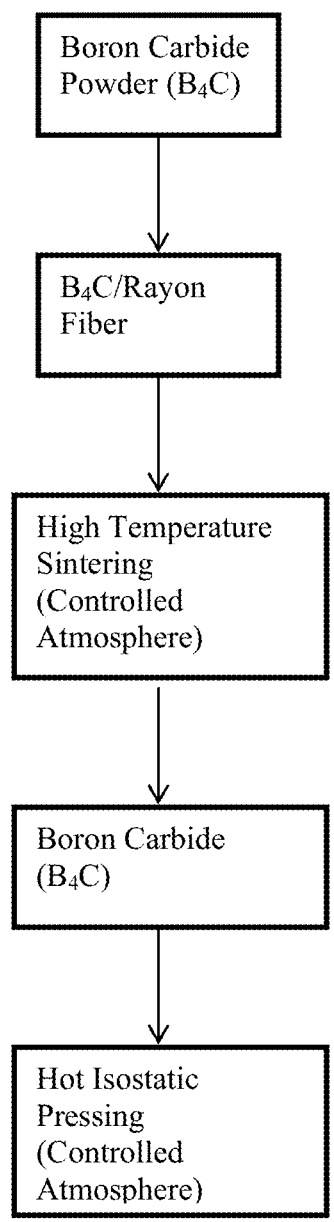
FIG. 7 is a block diagram showing an exemplary process for producing boron carbide fiber from boron carbide.

FIG. 7 shows an exemplary direct method of forming boron carbide fiber from boron carbide ($B_4C$) powder. Both carbon and alumina are common sintering aids for $B_4C$, which help boron carbide to sinter close to its full density. Boron carbide fibers can be made with or without sintering aids for pressureless sintering. In another exemplary embodiment, the carbon produced during the carbonization of cellulose $(C_6H_1O_5)_n$ may be used as the sintering aid for boron carbide fiber, as shown in formula (2) below. Also, alumina ($Al_2O_3$), or other sintering aids, may be added to the fiber, as shown in formula (3). Pure $B_4C$ and alumina particles may be dispersed in rayon fiber. The final products of both formulas (2) and (3) will be high-density boron carbide fiber.

$$B_4C+C \rightarrow B_4C \tag{2}$$

$$B_4C+C+Al_2O_3 \rightarrow B_4C \tag{3}$$

Route No. 3: Boron Carbide ($B_4C$) Fiber from Boron Oxide ($B_2O_3$)

Figure 8:
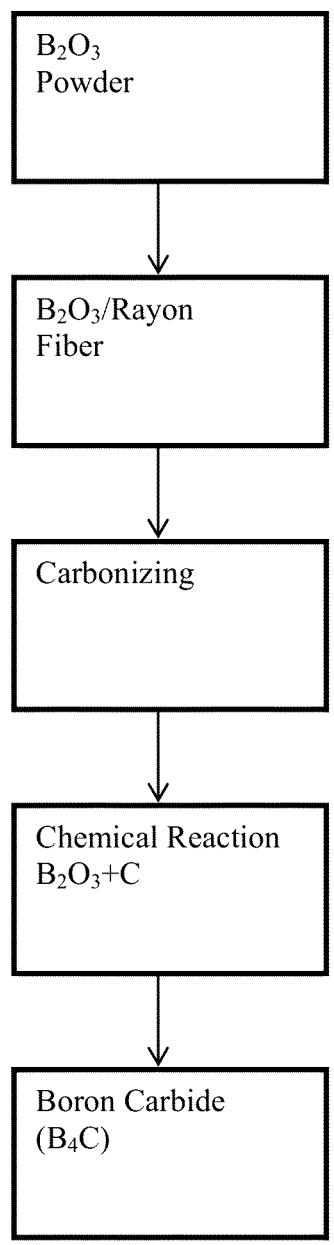
FIG. 8 is a block diagram showing an exemplary process for producing boron carbide fiber from boron oxide.

FIG. 8 shows an exemplary carbothermal method of forming boron carbide fiber from boron oxide ($B_2O_3$) powder. Boron oxide powder can be used to fabricate $B_2O_3$ green fiber, using, for example, VSSP fiber spinning techniques. This fiber will be a composite comprising $B_2O_3$ particles in a cellulose matrix. The composite may be carbonized (graphitized) and then boron carbide may be produced as a result of a boron oxide and carbon chemical reaction, as shown in formula (4). To reduce the reaction temperature, magnesium may be added to the fiber, as shown in formula (5), which reduces the reaction temperature. Upon heat treatment, the carbon, produced during the carbonization of cellulose $(C_6H_{10}O_5)_n$, reacts with boron oxide and $B_4C$ is formed.

$$2B_2O_3+7C \rightarrow B_4C+6CO \tag{4}$$

$$2B_2O_3+6Mg+C \rightarrow B_4C+6MgO \tag{5}$$

Rout No. 4: Boron Carbide ($B_4C$) Fiber from Boron Oxide-Absorbed Rayon Fiber

In this route, a slurry may be made of boron oxide and water or other liquids such as alcohol, acetone, etc. The amount of solid boron oxide in the slurry can vary from about 2-80 wt %. A rayon fiber may be passed through the slurry, and the rayon fiber absorbs boron oxide and the liquid. Upon drying, the resultant fiber will have boron oxide particles dispersed uniformly in the rayon fiber. Upon heat treatment, the carbon, produced during the carbonization of cellulose $(C_6H_{10}O_5)_n$, reacts with boron oxide and $B_4C$ is formed:

$$(Cellulose)-7C+2B_2O_3 \rightarrow B_4C+6CO \tag{6}$$

Once the boron carbide fiber is formed by the spinning process (i.e., green fiber), the spun fiber may be further treated to improve the properties (e.g., density and hence the hardness) of the fiber. For example, the boron carbide fiber may be sintered at high temperature. In a preferred embodiment, the boron carbide fiber may be processed by pressureless sintering to achieve about 92% to about 97% theoretical density. Optional, or in addition, the boron carbide fiber may further processed by, for example, hot isostatic pressing (Post-HIPing) to further improve the fiber properties (e.g., density to about 99% to about 100% theoretical density).

Figure 9A:
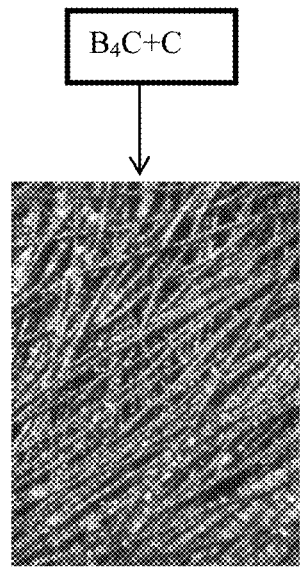
FIGS. 9A, 10A, and 11A show exemplary boron carbide fibers.
Figure 9B:
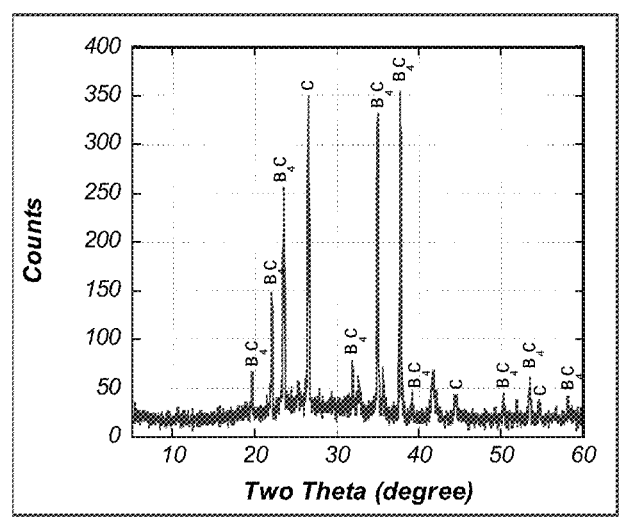
FIGS. 9B, 10B, and 11B show exemplary x-ray diffraction patterns for the fibers of FIGS. 9A, 10A, and 11A.
Figure 10A:
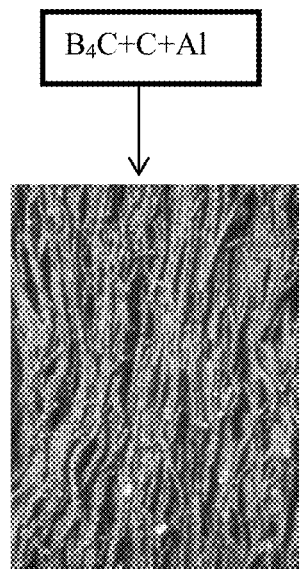
Figure 10B:
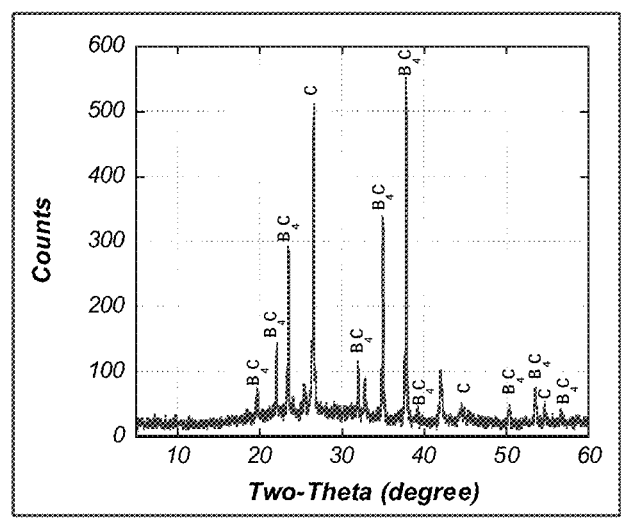
Figure 11A:
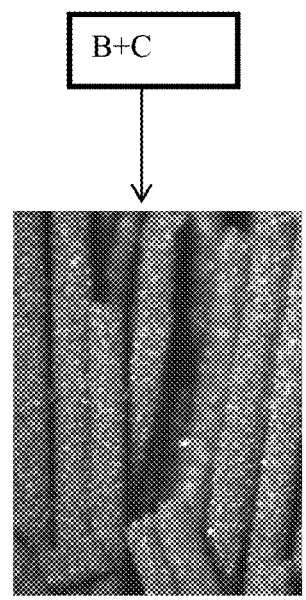
Figure 11B:
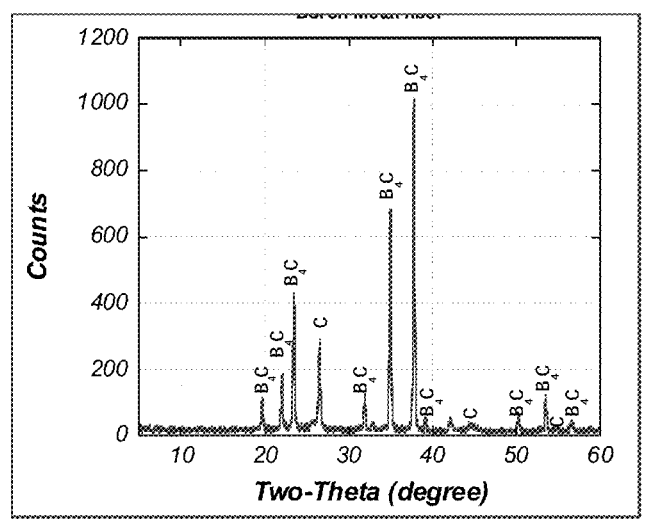

FIGS. 9A-11B show examples of three different boron carbide ($B_4C$) fibers. FIGS. 9A and 9B show a fiber of $B_4C+C$ produced from boron carbide powder that carbonized; FIGS. 10A and 10B show a fiber of $B_4C+C+Al$, where alumina oxide (e.g., about 5% alumina) was added as a sintering aid; and FIGS. 11A and 11B show a fiber produced from B+C, carbon reactive with boron. The exemplary fibers of FIGS. 9A-11B were produced in a graphite furnace. The firing conditions were 2,200° C. for 1 hour in a controlled atmosphere of Helium (He) at 2CFM. The fiber of FIGS. 9A and 9B was produced via route 2, formula (2); the fiber of FIGS. 10A and 10B was produced via route 2, formula (3); and the fiber of FIGS. 11A and 11B was produced via route 1, formula (1) described infra. In each case, high purity and high density boron carbide fiber may be produced.

FIGS. 9B, 10B, and 11B illustrate x-ray diffraction results showing peaks of boron carbide and peaks of carbon. The height of the peak illustrates how much of a particular material is present in the fiber. The peaks of carbon show the amount of free carbon present in the fiber. FIGS. 11A and 11B shows a much lower carbon peak (i.e., a lot cleaner fiber) because there was no boron carbide to start and the majority of the carbon in the precursor material (i.e., the cellulose of the rayon fiber) reacted with the boron to form boron carbide in fiber form.

For the boron carbide fiber illustrated in FIG. 1, the carbon in the cellulose of the carbon matrix precursor (e.g., rayon fiber) is used as a sintering aid for the production of boron carbide using pressureless sintering. This departs from the conventional method, which burns off the carbon prior to sintering. The carbon present in the cellulose that is used as a binder in the fiber forming process is also used as a sintering aid during the sintering process. Carbon is one of the best sintering aids for the production of boron carbide. The carbon in the precursor material reacts with the boron particles dispersed through out the fiber and helps boron carbide to sinter to full density, at lower sintering temperature and without high pressure.

As illustrated and described, the fibers may have varying diameters. Fibers of various diameters may be produced by, for example, varying the size of hole in spinneret; using different size particles; and the like. Particle and fiber size may range from nano size to hundreds of micron size. For example, extrusion or other techniques for forming the fiber may allow for larger particle sizes and fiber diameters. In certain embodiments, for example spinning of fiber using VSSP, particles size is preferably between about 1 μm to about 7 μm. Preferred fiber sizes range from about 5 μm to about 5 mm in cross-sectional diameter. Other embodiments may comprise fine diameter fibers. Fine diameter fibers may have a diameter of about 5 μm to about 15 μm.

Fiber Formation Process:

One preferred method of preparing the fiber (i.e., filament or tow) includes Viscose Suspension Spinning Process (VSSP). VSSP is an aqueous process for producing fibers comprising refractory/metal-based material. In one embodiment, a dispersion of particles of refractory material/metal-based material is prepared first. The dispersion may then be mixed with a carrier solution of a salt of cellulose xanthate to form a spin mix. Using general wet spinning techniques, a filament of regenerated cellulose may be formed from the spin mix. The filament has the particles dispersed therein. At this point, the filament can be utilized as a mixture of cellulose and refractory/metal-based material (i.e., green fiber), or it can be heat treated (i.e., ceramic fiber). If heated, the filament is raised to sufficient temperatures and over sufficient durations to remove substantially all of the regenerated cellulose and to sinter the particles of refractory material to form a filament. Embodiments of the present invention may use the carbon in the cellulose as a sintering aid. Embodiments of the present invention may also use the carbon in the cellulose to react with (i.e., bond) the metal-based material dispersed therein.

Figure 4:
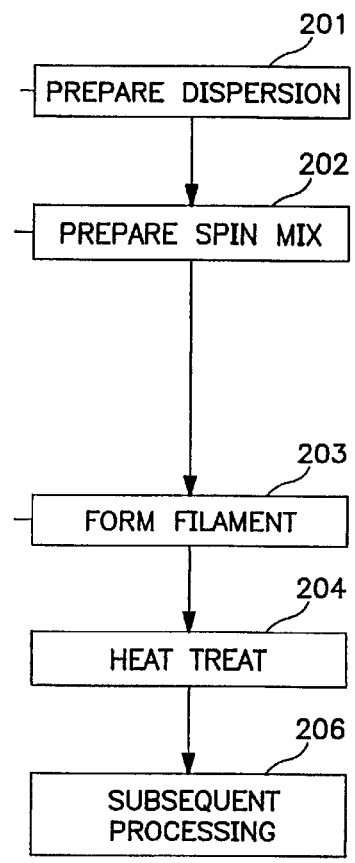
FIG. 4 is a block diagram illustrating an exemplary process for forming filament/fiber.

FIG. 4 shows the general process for production of spun filament or fiber. Block 201 depicts the first step in which a dispersion of particles of refractory material is prepared. Aside from the dispersion medium and the refractory material, the dispersion may also contain dispersing agents and other constituents. In Block 202, the dispersion is mixed with a carrier solution or dispersion of a salt of cellulose xanthate to form a spin mix. Using wet spinning techniques, a filament of regenerated cellulose is formed from the spin mix as shown in Block 203. The cellulose filament has the particles dispersed therein. At this point, the filament can be used as a combination of refractory/metal-based material and cellulose, or it can be heat-treated. Block 204 depicts the optional heat treating step wherein the filament is passed through a firing furnace to pyrolize the carrier and to sinter the remaining refractory material particles to form a ceramic fiber. In Block 206, subsequent processing steps are depicted which may include, for example, annealing, metal impregnation, and coating.

Figure 5:
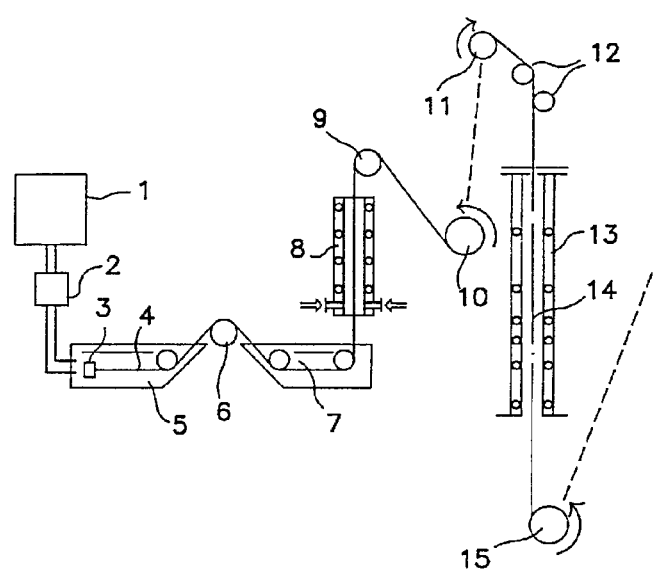
FIG. 5 shows a schematic of an exemplary process for forming filament/fiber using a wet spinning technique.

FIG. 5 is a schematic depiction of an exemplary VSSP for use in manufacturing high temperature metal-based ceramic filaments. Cellulose saturated with a base may be reacted with carbon disulfide in reactor 1 to form sodium cellulose xanthate. The cellulose xanthate derivative may then be dissolved in aqueous sodium hydroxide or another aqueous base to form a viscous solution or dispersion commonly called viscose. A dispersion of refractory material/metal-based material particles may be mixed with the viscose.

This mixture may be pumped by a metering pump 2 through a spinneret 3 directly into a spin bath 5, also known as the acid bath or spin bath, at a rate of about 1 to 50 meters per minute or higher. The spinneret 3 may comprise a nozzle with a plurality of holes having a desired diameter. The number, size, shape and distribution of the holes in the spinneret and the number, size and shape of the spinneret(s) may vary widely, depending on the specific embodiment and desired end product. As shown, a draw godet roll 6 pulls on the filaments 4 to draw the spun fiber through the spin bath. The bundle of parallel filaments 4 stays in the spin bath 5 for a predetermined period, and may then pass through a second hot aqueous acid bath at temperatures generally around 90° C. to complete regeneration. The filaments may then be purified with water and other chemicals as necessary 7, either continuously or in a batch process and dried 8. A finish to impart lubricity to the filaments for further processing or other chemicals may be applied to the filaments before they are wound onto a package 10 for subsequent processing. After passing through a dryer 8 to evaporate the water, the dried rayon cellulose-ceramic-metal composite filaments 4 may be fed over a drawing element 9 and wound onto a take-up reel 10 to await further processing.

The take-up reel 10 wound with filaments may be transported and used as the feed reel 11 for the binder burnout (BBO) and sintering step or subsequent weaving, braiding, tufting or winding prior to sintering. As shown, the filaments 14 may be unwound from the feed reel 11 past the drawing elements 12 into the firing furnace 13. In the illustrated embodiment, densification of the fiber and sintering of the ceramic particles occurs in furnace 13 and at high temperatures of about 1,800° C. to about 2,300° C. depending upon the type of refractory powder/metal-based particles. More preferably, sintering may occur at about 2,000° C. to about 2,200° C. After firing, the filaments 14 may be wound onto a second take-up reel 15 to await further processing.

The fiber production process may produce a variety of cross section geometries. For example, the cross sectional geometries may include: kidney; crimp; tube; and the like. In an exemplary VSSP fiber production embodiment, fiber may be produced at a rate of about 5 m/min and about 10 kg of fiber may be produced per day using a single spinneret.

Additional details of the VSSP can be found in U.S. Pat. No. 5,827,797, which is incorporated herein by reference in its entirety. Embodiments of the present invention use the carbon in the cellulose as a sintering aid to ensure full density. Unlike conventional methods used with other materials that burn off the binder (i.e., the carbon), the carbon from the cellulose is not burned off but rather is used as a sintering aid to bind carbon with boron. This improves the process by reducing the number of steps required to form the fiber and reducing the amount of materials, while at the same time helping to ensure full density of the boron carbide fiber due to the carbon advantageous properties as a sintering aid.

In addition, alumina, such as aluminum oxide, may be mixed into the slurry and be dispersed in the green fiber to act as a sintering aid.

The carbon matrix or carbon fiber discussed above may comprise carbon fibers produced based on rayon, polyacrylonitrile (PAN), or pitch technologies. Carbon fibers offer an excellent combination of strength, low weight and high modulus.

Preferred embodiments of the present invention use high purity (or extremely high purity) carbon fiber as the precursor in the process for the production of boron carbide fiber. High purity as used herein means that the fiber does not contain any impurities, such as Fe, Ca, Na, or other elements and includes, for example, aerospace grade carbon fiber or food grade carbon fiber. High, or extremely high, purity carbon fiber results in high, or extremely high, purity carbides at the end of the process. The higher the purity of the carbon fiber, the higher the purity of the carbides produced. Purity levels can be determined via X-ray, or chemical analysis.

Fiber size may vary depending on the particular application. The fiber size may be determined in a number of ways, including the spinneret and spinneret holes, the powder particle size, and the like. In certain embodiments, the fiber may be between about 5 μm to about 5 millimeters in diameter. Use of nano powder may further allow production of fibers down to about 1 μm.

Figure 12A:
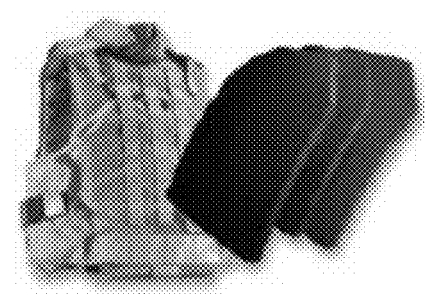
FIGS. 12A-12C show several exemplary applications where boron carbide fiber may be employed.

Applications:

Boron carbide fibers and fiber composites may find utility in ballistic applications, where the combination of high hardness, light weight, and high elastic modulus give the material an exceptionally high specific stopping power. This application area widely extends from body armor to tactical vehicles and aircraft for reinforcing and/or replacing the current state of the art ceramic and metal composite protective armors. Beyond military applications, boron carbide fibers and fiber composites may also find utility in civilian markets, including erosion resisting applications due to its high hardness, light weight, high elastic modulus, and erosion resistance characteristics that provide improved abrasion resistance. Boron carbide may also be used in conjunction with other materials to provide desired materials properties and characteristics. Some exemplary applications include:

Personnel Protection Systems:

Boron carbide fibers and fiber composites may be used in the manufacture of ballistic materials for protective, durable and light weight body armor, such as shown in FIG. 12A. The distinct characteristics of advanced boron carbide materials made from boron carbide ceramic fibers—light weight, high hardness, wear and corrosion resistant—offer advantages over conventional materials such as plastics and metals.

Boron carbide ceramics fibers may be manufactured in large volume and formed into various shapes and sizes to allow cost effective body armor production along with custom molding in massive quantities. Also, boron carbide ceramics fibers may be formed as composites to facilitate various applications.

Figure 12B:
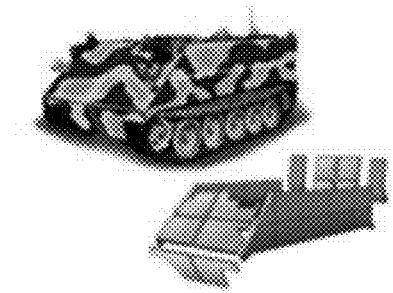
Figure 12C:

Vehicle Armor Systems:

Durable and light weight armor plating comprising boron carbide ceramics fibers and fiber composites may be incorporated into tactical vehicles, including armor systems and tank tracks, such as shown in FIGS. 12B and 12C. The system may provide flexible and responsive alternatives to local threat requirements allowing fast and effective adjustments to armor protection levels thereby improving survivability.

Aircraft Armor Systems:

Durable and light weight boron carbide ceramics fibers and fiber composites may be incorporated into aircraft protection systems for fixed wing and rotary type aircraft. Exemplary applications include panels, tiles, components, etc. comprising boron carbide ceramics fibers. Aircraft armor systems may be used to protect personnel and cargo areas, vital equipment, controls, and the like.

Automotive Industry:

Boron carbide fibers and fiber composites may be used in automobile manufacturing, as armor plating, in the vehicle body, in the construction of engine blocks, etc. For example, in one embodiment, an engine block may include a fiber composite comprising boron carbide fiber and aluminum metal.

Erosion Resisting Systems:

Boron carbide fiber reinforced composites may be used for break pads to reduce wear and increase stoppage power in automobiles, motorcycles, aircrafts, etc. The break pads in high speed cars wear off very fast. The use of a high modulus ceramic fiber, such as boron carbide, in break pads can significantly prolong the life of break pads. Boron carbide fiber can be used in any type of break pad by uniformly distributing short or long fibers in the pad matrix and thereby reinforcing it.

Definitions:

Carbonization is the term for the conversion of an organic substance into carbon or a carbon-containing residue through pyrolysis or destructive distillation. It is a process by which solid residues with increasing content of the element carbon are formed from organic material usually by pyrolysis in an inert atmosphere. As with all pyrolytic reactions, carbonization is a complex process in which many reactions take place concurrently such as dehydrogenation, condensation, hydrogen transfer and isomerization. The final pyrolysis temperature applied controls the degree of carbonization and the residual content of foreign elements. Generally, the higher the temperature, the higher the mass fraction (wt. %) of carbon content in the residue.

Pyrolysis is the chemical decomposition of organic materials by heating in the absence of oxygen or any other reagents, except possibly steam. Extreme pyrolysis, which leaves only carbon as the residue, is called carbonization. Pyrolysis is a special case of thermolysis. Pyrolysis typically occurs under pressure and at operating temperatures above 430° C.

Carbothermal Reduction: A chemical reaction within a carbon-metal oxide mixture in which the products form non-oxide ceramics such as silicon carbide, silicon nitride, and aluminum nitride.

Sintering: a method of making ceramic objects from powder, by heating the material (typically at high temperature, but below its melting point—solid stage sintering) until the particles adhere to each other (i.e., fuse the ceramic particles together).

Pressureless sintering is the sintering without applied pressure. This method of sintering helps avoid or reduce density variations in the final component, which typically occur with more traditional hot pressing methods.

The term "powder" is used interchangeably with "particles" and "refractory material particles." Furthermore, the term "dispersion" is intended to have broad meaning and is used to describe particles of refractory material dispersed, suspended, or dissolved in any manner in a liquid or viscose.

The term "ceramic" refers to oxides, nitrides, carbides, borides and silicides of metals or semi-metals and combinations thereof.

Relative density is a percentage that indicates how close a material is to its theoretical density, which implies having no pores.

High density preferably means a density greater than about 90%, or more preferably, a density greater than about 95% theoretical density. Preferably, boron carbide fibers produced using the disclosed processes and routes are high density.

Full density means full theoretical density. The theoretical density is basically calculated based on the location of the atoms in a crystal structure. Since atoms are generally spherical, there is always some distance between them and you can not fill-up every gap. Accordingly, based on the weight of the atom and the space that they occupy in a crystal structure, you have a density (i.e., theoretical density). Using conventional ceramic techniques, there are typically some defects present that reduce the density to less than theoretical density. Accordingly, in certain preferred embodiments, the boron carbide fibers produced approach or attain full density. For example, a full density of about 99% to about 100%.

EXAMPLES

The following are examples illustrating the manufacture of fine-diameter boron carbide ($B_4C$) fiber via the VSSP technique. Green fibers were made and pressureless sintering of boron carbide fiber and carbothermal reaction methods were investigated. Green fibers may be subsequently subjected to sintering trials. The fiber may be evaluated with XRD to study the existence of $B_4C$ or other phases in the ceramic fiber.

Boron carbide fiber manufacturing was pursued via two different routes to make $B_4C$ fibers. These include fiber manufacturing directly from $B_4C$ powder, which requires a high sintering temperature or use of a chemical route to accomplish the task at a lower temperature. Both routes require heat treatment in an atmospheric-controlled furnace. Pure boron carbide melts at 2450° C. and is hardly sintered to full density due to its covalent bonding. Therefore, pressure-assisted methods may be used to boost the density, which requires an extra step in the manufacturing process at higher cost of production. Sintering aids may be used to reach higher densities while at the same time reducing the sintering temperature. Carbon is a common sintering aid for $B_4C$. It was discovered that carbon inherent in the VSSP may be obtained from cellulose $(C_6H_{10}O_5)_n$. The amount of carbon obtained from cellulose depends on its carbon-yield during the carbonization process, however, the cellulose amount can be tailored in the VSSP process. Researchers have used 3-30 wt % carbon additives, however, at higher carbon percentage (30%), a low temperature eutectic composition forms in the B-C system. Other sintering aids such as $Al_2O_3$, SiC, $TiB_2$, Mg, etc. also have been used to sinter $B_4C$ ceramic. The examples used the following fibers to produce fully dense boron carbide fiber.

Boron (B) Fiber:

Boron powder (manufactured by SB Boron Corp, IL) was used to manufacture B-loaded rayon fiber. The powder particle size, measured by Fisher sub-sieve seizer (FSSS) was rated 0.7 μm. This means that the maximum particle size was 0.7 μm. Since, this was an amorphous powder, the particle size could not be measured by X-ray. This powder could not be formed into 20 μm fiber due to slurry agglomeration, which could result from particles much finer than 0.7 μm. However, green fiber with diameter of 135 um was successful made (FIG. 2A). The diameter this fiber after the heat treatment and turning into $B_4C$ is expected to be around 120 μm. The chemical reaction to form $B_4C$ is described here:

$$4B+C \rightarrow B_4C$$

Boron particles are dispersed uniformly in rayon matrix. Upon heat treatment, the carbon produced during the carbonization of cellulose $(C_6H_{10}O_5)_n$ reacts with boron metal and $B_4C$ is formed. This fiber may then be subject to heat treatment in a carbon furnace at, for example, 2200° C. for one hour in Ar atmosphere.

Boron Carbide ($B_4C$) Fiber:

Boron carbide fibers were made with two types of sintering aids for pressureless sintering, which include $B_4C+C$ and $B_4C+C+Al_2O_3$. Pure $B_4C$ particles were dispersed in rayon fiber. Both carbon and alumina are common sintering aids for $B_4C$. The carbon is from carbonized cellulose and 5 wt % alumina was added during fiber manufacturing. These fibers may then be subject to heat treatment in a carbon furnace at, for example, 2200° C. for one hour in Ar or He atmosphere.

Boron Oxide ($B_2O_3$) Fiber:

In industry, boron oxide is widely used to produce bulk boron carbide via a carbothermal reaction in an arc furnace:

$$2B_2O_3+7C \rightarrow B_4C+6CO$$

However, $B_2O_3$ is extremely reactive with water forming boric acid, which is problematic through a water-based technique, such as VSSP:

$$B_2O_3+3H_2O \rightarrow 2BO_3H_3$$

It was found that boric acid turns the viscose matrix into gel prematurely and premature gelation prevents the formation of boron oxide fiber. As such, the boron oxide particles may be coated to avoid the above reaction, however, the coating material should be such that to be removed easily in the subsequent heat treatment process without introducing any impurities.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed is:

1. A direct method for manufacturing boron carbide ceramic fiber from boron carbide, consisting of:
   digesting cellulose in an aqueous solution of sodium hydroxide and disulfide to form a viscose;
   dispersing a metal-based material in the cellulose based viscose to form a boron carbide loaded slurry, the metal-based material comprising boron carbide ($B_4C$);
   spinning the boron carbide loaded slurry to form a green fiber, the green fiber comprising a matrix of cellulose with the boron carbide dispersed therein, wherein in one step the green fiber and the cellulose matrix are formed, the cellulose acting as a binder in the fiber forming process;
   heat treating the boron carbide loaded cellulose matrix of the green fiber to a low temperature to produce excess carbon as a sintering aid, wherein via sintering the boron carbide fuses together as the temperature increases to a high temperature to form boron carbide ceramic fiber, and wherein the reaction forming boron carbide ($B_4C$) ceramic fiber is defined as: $B_4C+C \rightarrow B_4C$.

2. The method of claim 1, wherein the first portion is at least about 90% of the cellulose.

3. The method of claim 1, wherein the heat treating occurs in a single step in a furnace under a controlled atmosphere, wherein the temperature increases from a low temperature of about 500° C. to a high temperature of about 1,800° C. to about 2,300° C.

4. The method of claim 1, wherein:
the spinning further comprises pumping the slurry through a plurality of holes in a spinneret into a bath of warm, mild sulfuric acid with a high concentration of salt; and
further comprising an acid/base reaction that coagulates the cellulose into rayon green fiber with a high volume percentage of the metal-based material uniformly dispersed therein.

5. The method of claim 1, further comprising yielding high production volume of boron carbide ceramic fiber, high production volume yields comprising producing boron carbide ceramic fiber at a rate of at least about 5 m/min using a single spinneret.

6. The method of claim 1, further comprising producing fibers having a cross-sectional diameter in the range of from about 5 μm down to about 1 μm.

7. The method of claim 1, further comprising sintering at a high temperature the boron carbide ceramic fiber through use of the excess carbon in amounts sufficient for providing a sintering aid to improve the density and hardness thereof, and help reduce sintering temperature.

8. A direct method for manufacturing boron carbide ceramic fiber from boron carbide, consisting of:
digesting cellulose in an aqueous solution of sodium hydroxide and disulfide to form a viscose;
dispersing alumina ($Al_2O_3$) in the cellulose based viscose to form a boron carbide and alumina loaded slurry; and
spinning the boron carbide and alumina loaded slurry to form a green fiber, the green fiber comprising a cellulose matrix with the boron carbide and alumina dispersed therein, wherein in one step the green fiber and the cellulose matrix are formed, the cellulose acting as a binder in the fiber forming process;
heat treating the boron carbide loaded cellulose matrix of the green fiber to a low temperature to produce excess carbon as a sintering aid, wherein via sintering the boron carbide fuses together as the temperature increases to a high temperature to form boron carbide ceramic fiber,
and using the alumina as a sintering aid during the heat treating of the green fiber to form the boron carbide ceramic fiber, the reaction forming boron carbide ($B_4C$) ceramic fiber defined as: $B_4C + C + Al_2O_3 \rightarrow B_4C$.

9. A direct method for manufacturing boron carbide ceramic fiber from boron carbide, consisting of:
digesting cellulose in an aqueous solution of sodium hydroxide and disulfide to form a viscose;
dispersing a metal-based material in the cellulose based viscose to form a boron carbide loaded slurry, the metal-based material comprising boron carbide ($B_4C$);
spinning the boron carbide loaded slurry to form a green fiber, the green fiber comprising a matrix of cellulose with the boron carbide dispersed therein, wherein in one step the green fiber and the cellulose matrix are formed, the cellulose acting as a binder in the fiber forming process;
heat treating the boron carbide loaded cellulose matrix of the green fiber to a low temperature to produce carbon as a sintering aid, wherein the boron carbide fuses together as the temperature increases to a high temperature to form boron carbide ceramic fiber, and wherein the reaction forming boron carbide (B.C) ceramic fiber is defined as: $B_4C + C \rightarrow B_4C_1$,
and pressureless sintering of the boron carbide ceramic fiber to further densify and harden the metal carbide ceramic fiber
and hot pressing (Post- HIPing) the boron carbide ceramic fiber to further improve the density and hardness of the metal carbide fiber producing a full density boron carbide ceramic fiber.

10. A direct method for manufacturing boron carbide ceramic fiber from boron carbide, consisting of:
digesting cellulose in an aqueous solution of sodium hydroxide and disulfide to form a viscose;
dispersing a metal-based material in the cellulose based viscose to form a boron carbide loaded slurry, the metal-based material comprising boron carbide ($B_4C$);
spinning the boron carbide loaded slurry to form a green fiber, the green fiber comprising a matrix of cellulose with the boron carbide dispersed therein, wherein in one step the green fiber and the cellulose matrix are formed, the cellulose acting as a binder in the fiber forming process;
heat treating the boron carbide loaded cellulose matrix of the green fiber to a low temperature to produce carbon as a sintering aid, wherein the boron carbide fuses together as the temperature increases to a high temperature to form boron carbide ceramic fiber, and wherein the reaction forming boron carbide (B.C) ceramic fiber is defined as: $B_4C + C \rightarrow B_4C_1$,
and forming a composite incorporating the boron carbide fibers, wherein the composite further comprises a three dimensional woven composite.

* * * * *